(12) United States Patent
Wilmot et al.

(10) Patent No.: US 7,054,862 B2
(45) Date of Patent: *May 30, 2006

(54) METHOD AND SYSTEM FOR LONG-TERM UPDATE AND EDIT CONTROL IN A DATABASE SYSTEM

(75) Inventors: Gerald Johann Wilmot, Marina, CA (US); James Louis Keesey, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 691 days.

This patent is subject to a terminal disclaimer.

(21) Appl. No.: 09/895,889

(22) Filed: Jun. 29, 2001

(65) Prior Publication Data

US 2003/0004935 A1  Jan. 2, 2003

(51) Int. Cl.
*G06F 17/30* (2006.01)
*G06F 12/00* (2006.01)

(52) U.S. Cl. .............. 707/8; 707/2; 707/203
(58) Field of Classification Search .......... 707/10, 707/103 R, 203, 5, 8, 12; 709/200, 219; 235/383
See application file for complete search history.

(56) References Cited

U.S. PATENT DOCUMENTS

| | | | |
|---|---|---|---|
| 5,504,886 A | 4/1996 | Chang et al. | 395/600 |
| 5,649,185 A * | 7/1997 | Antognini et al. | 707/9 |
| 5,724,569 A | 3/1998 | Andres | 395/602 |
| 5,787,275 A | 7/1998 | Li | 395/614 |
| 5,832,499 A * | 11/1998 | Gustman | 707/103 R |
| 5,920,867 A | 7/1999 | Van Huben et al. | 707/101 |
| 5,966,707 A * | 10/1999 | Van Huben et al. | 707/10 |
| 6,035,303 A | 3/2000 | Baer et al. | 707/103 |
| 6,449,624 B1 * | 9/2002 | Hammack et al. | 707/203 |
| 6,654,747 B1 * | 11/2003 | Van Huben et al. | 707/10 |
| 6,658,415 B1 * | 12/2003 | Brown et al. | 707/10 |

FOREIGN PATENT DOCUMENTS

JP  2000-20362  1/2000

OTHER PUBLICATIONS

IBM Technical Disclosure Bulletin, Aug. 1989, "Multiple Maintenance Library Support System," vol. 32, No. 3B, pp. 50-56.

IBM DOSS: (ST919960058) Multiple Maintenance Library Support System, pp. 1-7.

Using the DOM as an XML/HTML repository API, Jonathan Robie, Texcel Research, Inc. 3207 Gibson Road, Durham, North Carolina 27703, Email: jonathan@texcel.no, May 1998, pp. 1-8 http://www.infoloom.com/gcaconfs/WEB/paris98/robie.HTM.

(Continued)

*Primary Examiner*—Uyen Le
*Assistant Examiner*—Susan Y. Chen
(74) *Attorney, Agent, or Firm*—Sawyer Law Group LLP

(57) ABSTRACT

Aspects for allowing long term, update and edit control in a database system are described. The aspects include providing library control functions in a database system, and utilizing the library control functions via structured query language statements to ensure data integrity of opaque data types in the database system. Provision of the library control functions further includes providing a checkout function and creating a set of update and delete triggers in correspondence with the checkout function.

15 Claims, 2 Drawing Sheets

OTHER PUBLICATIONS

Microsoft Repository Version 2 And The Open Information Model, Philip A. Bernstein, Thomas Bergstraesser, Jason Carlson, Shankar Pal, Paul Sanders, David Shutt, Microsoft Corp., One Microsoft Way, Redmond, WA 98052-6399, U.S.A., (Received Oct. 29, 1998; in final revised form Mar. 17, 1999), Information Systems vol. 24, No. 2, pp. 71-98, 1999, © 1999 Published by Elsevier Science Ltd. All rights reserved, Printed in Great Britain 0306-4379/99.

An Object-Oriented Relational Database, A relational DBMS and an object-oriented programming language can be combined to yield a surprisingly effective OO-DBMS for many applications., William J. Premeriant, Michael R. Blaha, James E. Rumbaugh, and Thomas A. Varwig., Edgar H. Sibley, Pauel Editor, Communications of The ACM/ Nov. 1990/vol. 33, No. 11, pp. 99-109.

Versions and Workspaces in Microsoft Repository, Thomas Bergstraesser, Philip A. Bernstein, Shankar Pal, David Shutt, Microsoft Corp., SIGMOD '99 Philadelphia PA, copyright ACM 1999 1-58113-084-Aug. 5, 1999 pp. 532-533.

* cited by examiner

METHOD AND SYSTEM FOR LONG-TERM UPDATE AND EDIT CONTROL IN A DATABASE SYSTEM

FIELD OF THE INVENTION

The present invention relates to database systems, and more particularly to ensuring data integrity through long term, update and edit control in a database system.

BACKGROUND OF THE INVENTION

Just as computers have become more and more prevalent in everyday life, networks of linked computers have become important in distributing information amongst computer users. Many computer systems are organized according to a client/server metaphor. Generally, in client/server computing, end users are each provided with a desktop computer or terminal known as a "client." The clients are connected using a network to another computer known as a "server", because its general function is to serve or fulfill requests submitted by clients. Application programs running on the clients prepare requests and transmit them to the server over the network. A 'network' of computers can be any number of computers that are able to exchange information with one another. The computers may be arranged in any configuration and may be located in the same room or in different countries, so long as there is some way to connect them together (for example, by telephone lines or other communication systems) so they can exchange information. Just as computers may be connected together to make up a network, networks may also be connected together through tools known as bridges and gateways. These tools allow a computer in one network to exchange information with a computer in another network.

Of particular interest in today's computing environment are relational database applications. Relational DataBase Management System (RDBMS) software using a Structured Query Language (SQL) interface is well known in the art. The SQL interface has evolved into a standard language for RDBMS software and has been adopted as such by both the American Nationals Standard Organization (ANSI) and the International Standards Organization (ISO).

In RDBMS software, all data is externally structured into tables. The SQL interface allows users to formulate relational operations on the tables either interactively, in batch files, or embedded in host languages such as C, COBOL, etc. Operators are provided in SQL that allow the user to manipulate the data, wherein each operator operates on either one or two tables and produces a new table as a result. The power of SQL lies in its ability to link information from multiple tables or views together to perform complex sets of procedures with a single statement.

The power of being able to gather, store, and relate information in database systems and then operate on that information through SQL allows for an almost limitless range of applications for such technology. Additionally, the ability to include opaque data types (e.g., character large objects (CLOBs)) along with basic data types (e.g., integers, strings, and decimals) has increased further the capabilities of database systems. With the advent of CLOBs, LOBs, and other opaque types, such as allowed through DB2IMAGE, DB2AUDIO and DB2VIDEO, a problem with ensuring data integrity of these data types has arisen. Due to their nature as more complex data, generally, access for update and edit take longer for opaque data types than for basic data types. Unfortunately, during the long term, extended periods of access, multiple users performing separate edits may diminish the ability to ensure data integrity of these data types in the database. Accordingly, a need exists for long term, update and edit control of opaque data types in a database system. The present invention addresses such a need.

SUMMARY OF THE INVENTION

Aspects for allowing long term, update and edit control in a database system are described. The aspects include providing library control functions in a database system, and utilizing the library control functions via structured query language statements to ensure data integrity of opaque data types in the database system. Provision of the library control functions further includes providing a checkout function and creating a set of update and delete triggers in correspondence with the checkout function.

Through the present invention, data integrity of opaque data types in a database system is more readily assured. The present invention advantageously employs functions that allow update and edit control to be realized for opaque data types in a straightforward and efficient manner. These functions further allow serialization of work on complex data types, including workflow document data types. These and other advantages of the aspects of the present invention will be more fully understood in conjunction with the following detailed description and accompanying drawings.

DETAILED DESCRIPTION

The present invention relates to ensuring data integrity through long term, update and edit control in a database system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
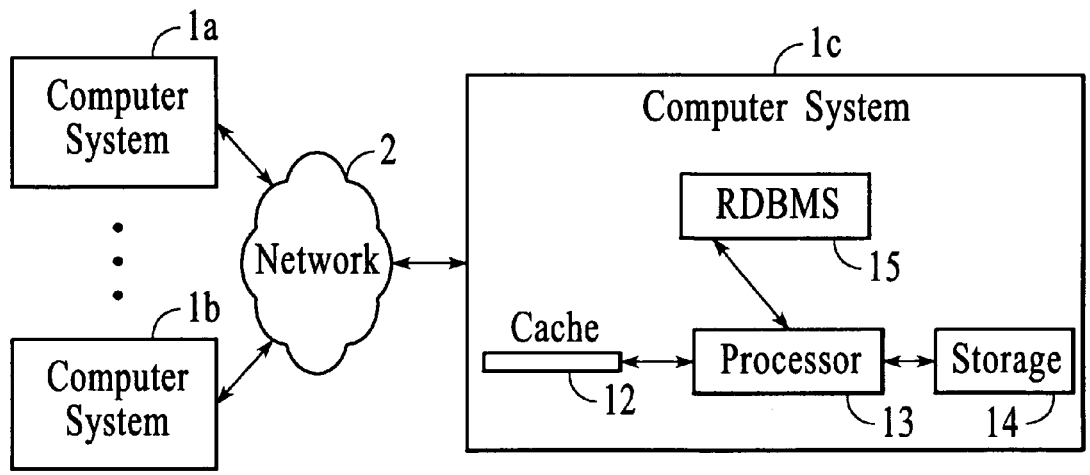
FIG. 1 illustrates an overall block diagram of a computer system network in accordance with the present invention.

As shown in FIG. 1, a plurality of computer systems 1a, 1b, 1c is interconnected via a network 2 (which could be the public Internet or a private intra-corporate Intranet or wide area network). It should be appreciated that although FIG. 1 illustrates a network of computer systems, this is meant as exemplary and not restrictive of the type of environment suitable for the aspects of the present invention. Thus, the aspects may also be provided within a single computing system environment. Accordingly, one (1c) of the computer systems is shown expanded for further illustration.

Computer system 1c has a processor 13 for controlling the overall operation of the computer system 1c, a high speed cache memory 12, a long-term storage device 14 (e.g., hard disk drive), and a database management system 15, e.g., an RDBMS system, such as DB2.

In accordance with the present invention, functions are provided that allow long term, update and edit control of opaque data types. These functions are integrated into the database system 15 to allow access via SQL statements executed in the database system 15. Preferably, these functions are provided as user-defined functions. A user-defined function (UDF) generally refers to a function that is defined to the database management system and can be referenced thereafter in SQL queries. Alternatively, the function 20 may be defined through standard techniques as a built-in function within a database system.

Figure 2:
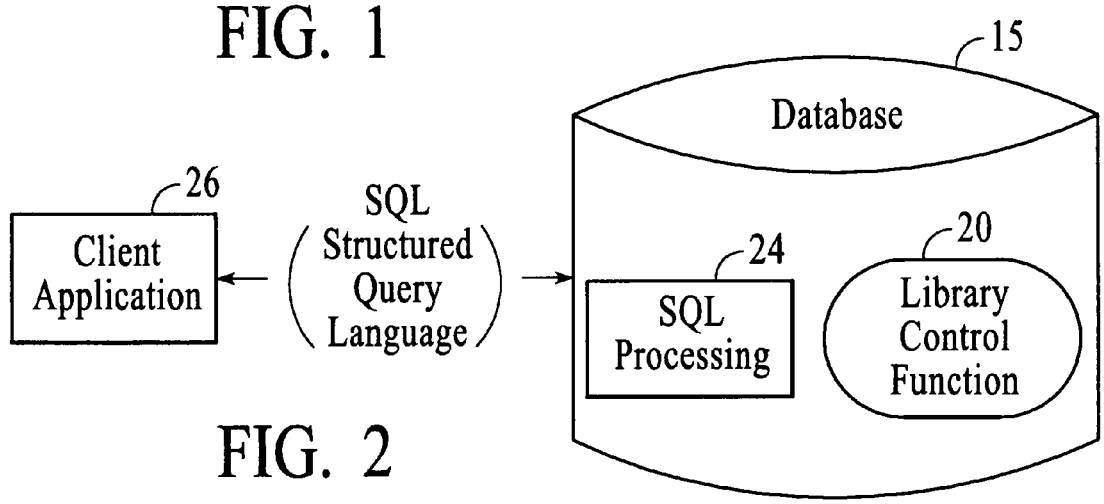
FIG. 2 illustrates a diagram representation of a database system environment in accordance with the present invention.
Figure 3:
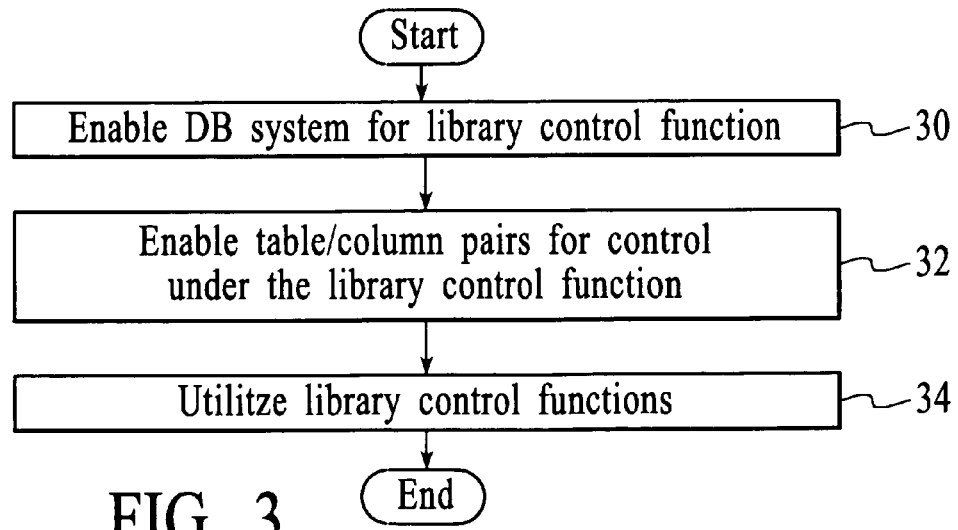
FIG. 3 illustrates a block flow diagram for long term, update and edit control in a database system in accordance with the present invention.

Referring to the diagrams of FIG. 2 and FIG. 3, in accordance with the present invention, a database system 15 is enabled for library control functions 20 for existing and new data in the database system 15 (step 30), which creates a set of update and delete triggers. Once the database is enabled for library control functions, table/column pairs are enabled for control under the library control functions (step 32). The library control functions also create a set of side tables for each selected table that contains library-controlled columns. The side tables are used for controlling update and delete access to the columns. Thus, if the selected table has an identity column, then the library control functions use the identity and column intersection as a key to identify the data cell. If the selected table does not have an identity column, then the library functions alter the user table and create an identity column. Following enablement, utilization of the library control functions occurs (step 34). Thus, a user invokes the library control functions via a select statement from a client application 26 which will checkout (Lock) or checkin (Unlock) a cell or set of cells in a managed database table.

By way of example, suppose an advertising firm had a table that contained images as Logos and Documents describing these logo images, where the column for the Logos and the column for the Documents were under control of the library control functions. A SQL statement for checking out the logo images and the associated document would be suitably represented by: SELECT checkout(logo), checkout(document) FROM hotmedia WHERE company='IBM'

In this example, the statement would create a set of entries in the control side tables for the hotmedia table for each row-column pair where the company was equal to 'IBM'. The entries in the control side table would contain the SQL identifier (SQLID) of the user as the identity, and the column name. The column name and identity would be the primary key, which would prevent the cell from being checked out to another user.

If the checkout is successful, then the user would be free to update the checked-out cell with new or modified data. With the control side table, a row can only be deleted if no cells are checked-out, or the only checked-out cells are checked-out to the user performing the deletion. The action of deleting the row also removes any control entries from the control side table.

Alternatively, when the user with the lock updates the item in the row, the control entry is removed from the control side table, making the item available for another user to check out (i.e., it is automatically checked-in on update). Having an item checked-out does not prevent anyone from querying the item. It only prevents changes (i.e., deletes and updates). Thus, control is achieved over updates and edits for opaque data types.

Figure 4:
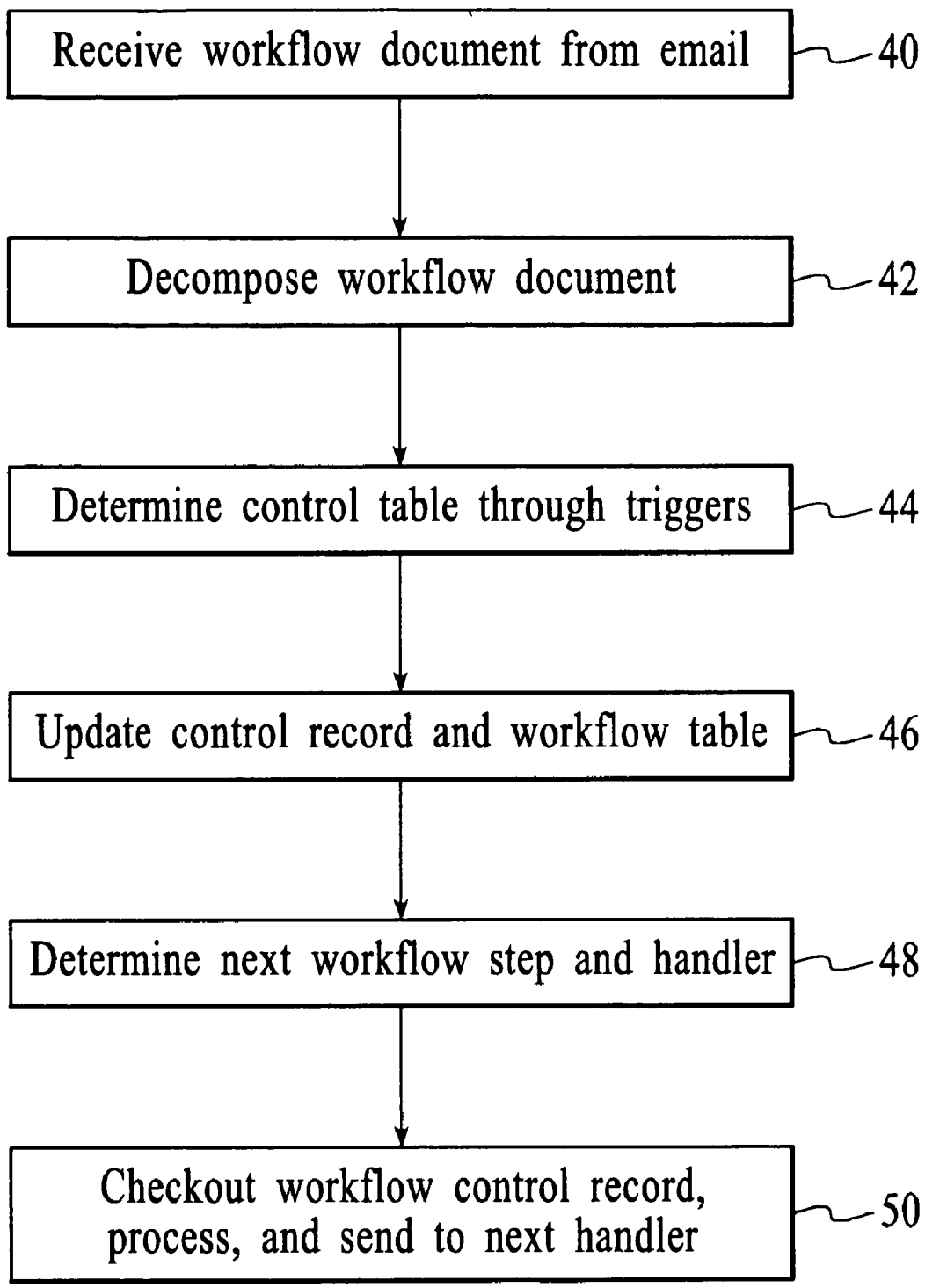
FIG. 4 illustrates a block flow diagram for implementing the control features of the present invention in a workflow document embodiment.

The control over update and edit of opaque data types in accordance with the present invention allows for serialization of work on complex data objects. In this manner, workflow documents are included as a type of opaque data type. Current workflow systems use dedicated connect clients that need to be connected to the workflow server in order to accomplish their tasks. The dedicated connection restricts the ability to dynamically expand the workflow system in a work environment, such as across the Internet. In order to provide a more expandable workflow system, the aspects of library control functions are combined with an XML Extender feature of DB2, as described with reference to the flow diagram of FIG. 4.

The process starts with an XML (extensible markup language) workflow document arriving in an electronic mail queue of a system participating as a workflow system (step 40). The workflow document is decomposed by the XML Extender into the IncomingQueue table of the database (step 42). Triggers on the IncomingQueue table use the workflow type, key, and user-id columns of the table to determine which control table contains the control record that is associated with the request (step 44). This information is used by the triggers to update the control record with the current workflow step and update a workflow data table with the incoming data (step 46). The trigger also uses the state information in the control record to do a lookup in the workflow table to determine the next step in the workflow and to identify a handler for that next step (step 48). Once the triggers have updated the control record, an after trigger fires a stored procedure, which checks out the workflow control record, composes an XML document using the XML Extender, and sends that to the appropriate handler for processing the next step (step 50).

Through the present invention, data integrity of opaque data types in a database system is more readily assured. The present invention advantageously employs functions that allow update and edit control to be realized for opaque data types in a straightforward and efficient manner. These functions further allow serialization of work on complex data types, including workflow document data types.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in to the art without departing from the spirit and scope of the appended claims.

What is claimed is:

1. A method for allowing update and edit control over an extended time period in a database system, the method comprising:

defining library control functions in a database system, including providing a checkout function to lock at least one cell in a managed database table of the database system; wherein defining library control functions further comprises creating a set of update and delete triggers in correspondence with the checkout function, wherein defining library control functions further comprises creating a set of control tables for each selected table that contains columns enabled for control under the library control functions; and utilizing the library control functions via structured query language statements to ensure data integrity during accessing of complex data objects comprising opaque data types in the database system, wherein utilizing the library control functions further comprises utilizing the set of control tables to designate a primary key, the primary key being based on an identity of a user accessing data as well as a column name of the data being accessed, further comprising utilizing the primary key as an edit control mechanism for a checked-out cell until an update occurs by the user.

2. The method of claim 1 wherein utilizing the library control functions further comprises utilizing the library control functions to control access to a workflow document.

3. The method of claim 2 wherein the workflow document further comprises a decomposed XML document.

4. The method of claim 3 wherein the decomposed XMIL document further comprises an XML workflow document received via electronic mail.

5. The method of claim 4 wherein the set of update and delete triggers streamline performance of each workflow step from the decomposed workflow document.

6. A system for allowing update and edit control over an extended time period in a database system, the system comprising:
at least one computer processing device; and
a database management system installed on the at least one computer processing device, the database management system supporting definition of library control functions and utilization of the library control functions via structured query language statements that include a checkout function to lock at least one cell in a managed database table of the database system to ensure data integrity during accessing of complex data objects comprising opaque data types in the database system, wherein the database management system further supports creation of a set of update and delete triggers in correspondence with the checkout function, wherein the database management system further supports creation of a set of control tables for each selected table that contains columns enabled for control under the library control functions, wherein the database management system further supports utilizing the library control functions through utilizing the set of control tables to designate a primary key, the primary key being based on an identity of a user accessing data as well as a colunm name of the data being accessed, wherein the database management system further supports utilizing the primary key as an edit control mechanism for a checked-out cell until an update occurs by the user.

7. The system of claim 6 wherein the database management system further supports utilizing the library control functions to control access to a workflow document.

8. The system of claim 7 wherein the workflow document further comprises a decomposed XML document.

9. The system of claim 8 wherein the decomposed XML document further comprises an XML workflow document received via electronic mail.

10. The system of claim 9 wherein the set of update and delete triggers streamline performance of each workfʟow step from the decomposed worktlow document.

11. A computer readable medium containing program instructions for allowing update and edit control over an extended time period in a database system, the program instructions comprising:
defining library control functions in a database system, including providing a checkout function to lock at least one cell in a managed database table of the database system and creating a set of update and delete triggers in correspondence with the checkout function; wherein defining library control functions further comprises creating a set of control tables for each selected table that contains columns enabled for control under the library control functions; and
utilizing the library control functions via structured query language statements to ensure data integrity of opaque data types in the database system wherein utilizing the library control functions further comprises utilizing the set of control tables to designate a primary key, the primary key being based on an identity of a user accessing data as well as a column name of the data being accessed, further comprising utilizing the primary key as an edit control mechanism for a checked-out cell until an update occurs by the user.

12. The computer readable medium of claim 11 wherein utilizing the library control functions further comprises utilizing the library control functions to control access to a workflow document.

13. The computer readable medium of claim 12 wherein the workflow document further comprises a decomposed XML document.

14. The computer readable medium of claim 13 wherein the decomposed XML document further comprises an XML workflow document received via electronic mail.

15. The computer readable medium of claim 14 wherein the set of update and delete triggers streamline performance of each workflow step from the decomposed workflow document.

* * * * *

UNITED STATES PATENT AND TRADEMARK OFFICE
CERTIFICATE OF CORRECTION

PATENT NO. : 7,054,862 B2
APPLICATION NO. : 09/895889
DATED : May 30, 2006
INVENTOR(S) : Wilmot et al.

It is certified that error appears in the above-identified patent and that said Letters Patent is hereby corrected as shown below:

Title Page

Item (56), References Cited, add:

6,061,689 A   5/2000   Chang et al. …..707/103

Column 4

Line 50, delete "to" after "in" and before "the".

Column 6

Line 7, delete "workf low" and replace with --workflow--.

Signed and Sealed this

Second Day of January, 2007

JON W. DUDAS
*Director of the United States Patent and Trademark Office*